Oct. 8, 1957
N. C. WILLIAMS
2,808,902
TRACTOR BRAKE RETARDING SYSTEM
Filed Feb. 28, 1955
2 Sheets-Sheet 1
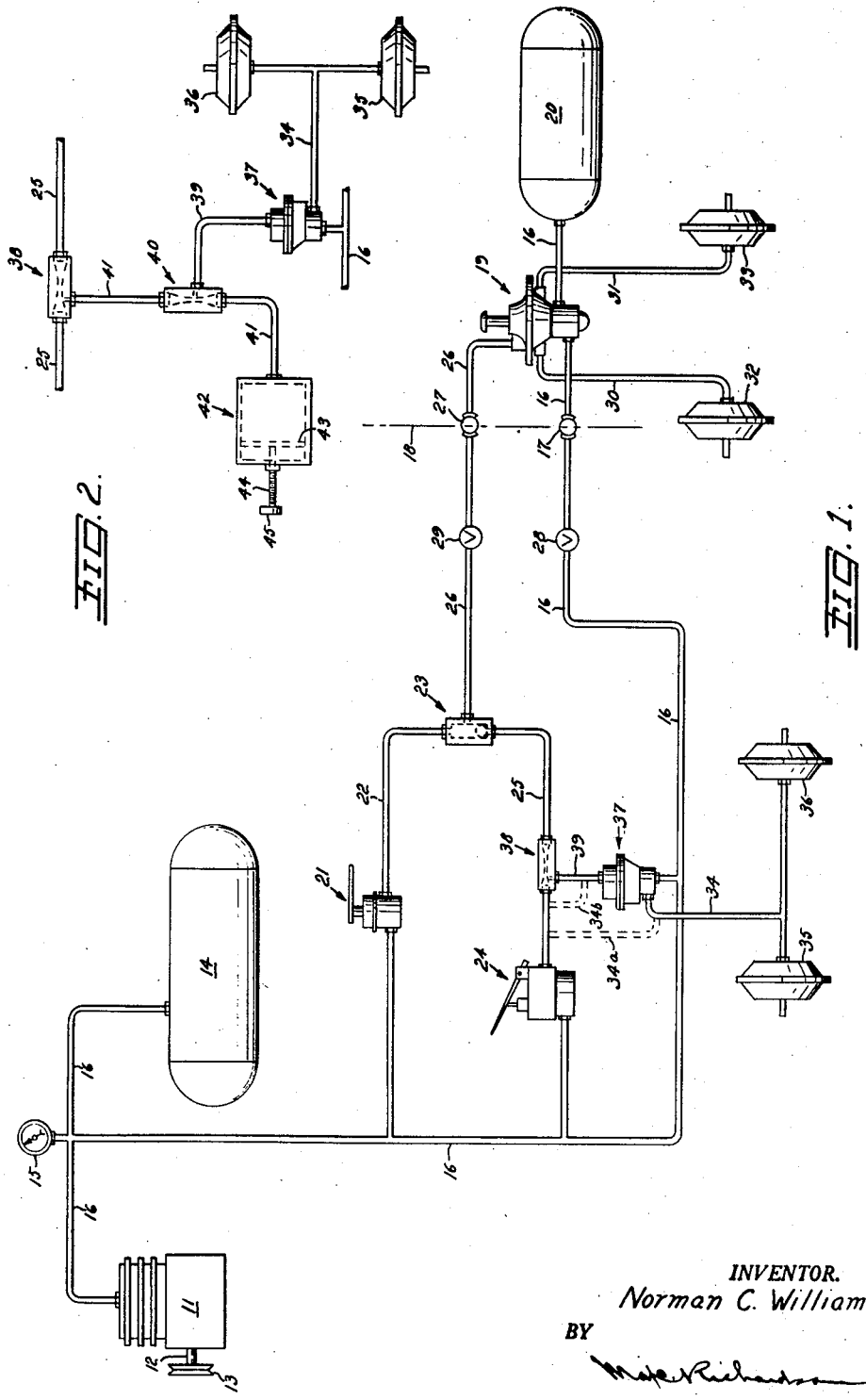
INVENTOR.
Norman C. Williams
BY
AGENT Oct. 8, 1957  N. C. WILLIAMS  2,808,902
TRACTOR BRAKE RETARDING SYSTEM
Filed Feb. 28, 1955  2 Sheets-Sheet 2
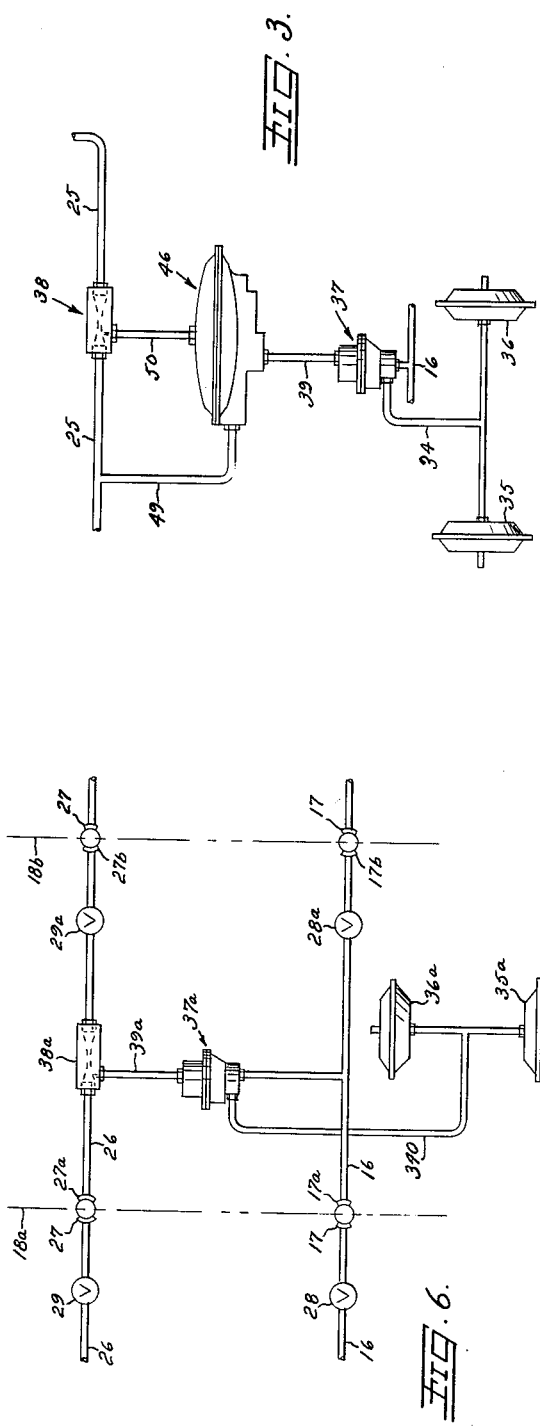
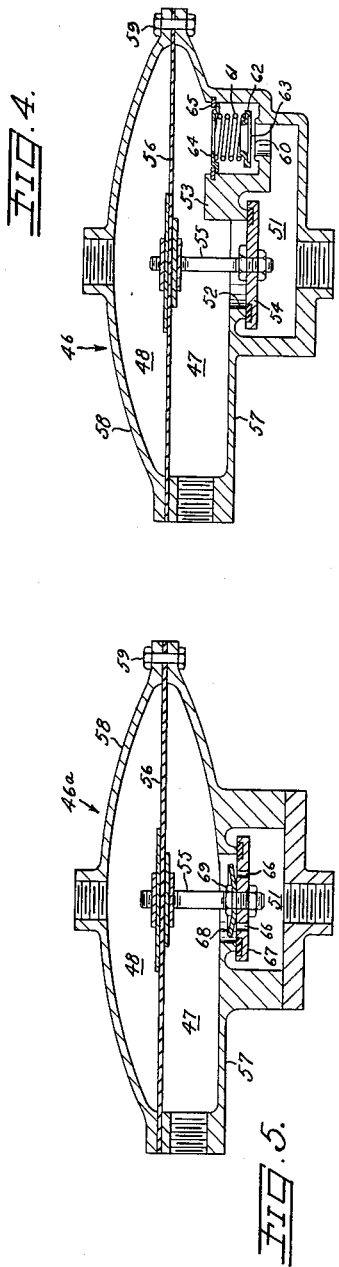
INVENTOR.
Norman C. Williams
BY
AGENT

United States Patent Office 2,808,902
Patented Oct. 8, 1957

2,808,902

TRACTOR BRAKE RETARDING SYSTEM

Norman C. Williams, Portland, Oreg., assignor to Power Brake Equipment Company, a corporation of Oregon Application February 28, 1955, Serial No. 490,783

5 Claims. (Cl. 188—3)

This invention relates generally to air brake systems for over-the-road automotive trains having one or more vehicles in the train. More particularly the system of this invention includes automatic means which on the application of control air for the purpose of applying all of the brakes of the train will retard the application of air to the more forward brakes of the train until air has first been applied to the next rearward brakes of the train.

Should the train consist of a single truck with air brakes on the front wheels and on the rear wheels of the truck this system provides automatic means for retarding or delaying the application of the front wheel brakes until application air has first been effectively applied to the rear wheel brakes.

Should the train consist of a truck and a trailer or a tractor and a semi-trailer, this system provides automatic means for retarding or delaying the application of the forward vehicle brakes until application air has first been effectively applied to the rearward vehicle brakes.

Should the train consist of a truck or tractor and more than one trailer vehicle, the system provides automatic means for retarding or delaying the effective application of air to the brake operating mechanism of any of the brakes of the train until the next rearward brakes of the train have had effective application of brake setting air applied to them.

The invention resides both in the means provided for assembling the systems and in the systems provided to accomplish the above described operational actions or objects.

Some of the novel and useful systems and the novel and useful parts thereof together with their effective operation are disclosed in the following description referring to the attached drawings in which Fig. 1 shows schematically the parts and arrangement of parts of a system of this invention for a train of two vehicles in which the application of the brakes on the forward vehicle is to follow the application of the brakes of the rearward vehicle.

Fig. 2 shows a fragmentary part of the system of Fig. 1 showing a variation of the means for retarding the application of the forward brakes.

Fig. 3 shows a fragmentary part of the system of Fig. 1 similar to Fig. 2 but with another variation of the means for retarding the application of the forward brakes.

Fig. 4 is a view in vertical section of a novel element of the system partially shown in Fig. 3.

Fig. 5 is a view in vertical section of a modified form of the element shown in Fig. 4.

Fig. 6 is a fragmentary view of a system for a train of more than two vehicles showing the additional equipment to be added for each vehicle between the forward and rearward vehicles of Fig. 1.

Like numerals of reference refer to like parts in the several figures of the drawing.

Referring now to the drawings it should be noted that generally the system of Fig. 1 is the system described in the co-pending application S. N. 449,831, filed August 16, 1954, now Patent No. 2,772,926, on an Emergency Air Relay Valve of which applicant is a co-inventor. The air compressor 11 shown equipped with a driven shaft 12 carrying a V-belt sheave 13 through which the compressor is driven by a motor and V-belt, not shown, supplies air under pressure to a storage tank 14 and a pressure gauge 15 and to emergency line 16 which has flexible hose connection with the rearward vehicle through hose coupling 17. The dot dash line 18 indicates the separation of the parts of the system on the forward vehicle from the parts on the rearward vehicle. Controlled as described in application S. N. 449,831, now Patent No. 2,772,926, by emergency relay valve 19 line 16 also supplies air to air tank 20 on the rearward vehicle.

Hand valve 21 connects emergency line 16 with control line 22 leading to two way check valve 23. Hand valve 21 acts selectively to apply the brakes of the rearward vehicle only when that is desired. Foot valve 24 connects line 16 with control line 25 leading to two way check valve 23 as shown. Control line 26 leads from two way check valve to the control side of emergency relay 19. Hose coupling 27 is inserted in line 26 as the line passes from one vehicle to the other. Stop valves 28 29 are inserted in lines 16 and 26 respectively for use when the vehicles are separated and couplings 17, 27 are separated.

Lines 30 31 from emergency relay 19 supply brake application air to rear vehicle brake air chambers 32 33 respectively.

Line 34 supplies brake application air to front vehicle brake air chambers 35 36.

As shown in co-pending application S. N. 449,831, now Patent No. 2,772,926, and in accordance with common practice before the invention of the present system, line 34 would be connected directly to line 25 as shown by dotted line 34a. Or if the line 34 was long and large the relay 37 would be inserted between line 16 and line 34 to supply air from emergency line 14 to brake chambers 35, 36 as controlled by the air bled to control line 25 by foot valve 24. In neither of these old practice cases would the venturi tube device 38 of this invention be used or inserted in line 25.

Without the use of venturi tube 38 or relay valve 37 the common operation of such a system would be that when the operator wished to slow the train moderately he would manipulate hand valve 21 thus modulating air into line 22 from line 16. Check valve 23 would operate to close line 25 and admit modulated air into line 26 from line 22. This air in line 26 controlled by hand valve 21 would operate on relay valve 19 to cause air to be admitted from line 16 to lines 30, 31 at the same pressure as the air in line 26. The rear vehicle brakes would be operated by chambers 32, 33 with brake drag modulated in accordance with the handle position of valve 21. The front vehicle brakes would not be operated.

When greater or sudden braking effort was desired to be put on the train the operator would use the foot valve 25 and admit air modulated in accordance with the pedal position from line 16 to control line 25. Check valve 23 would operate to close line 22 and admit air to control line 26 and at the same time admit air from line 25 directly through lines 34a, 34 to brake air chambers 35, 36 thus operating all brakes at substantially the same time and in the same amount. Or if relay valve 37 were used air would be admitted from line 25 through line 34b to the control chamber of valve 37 and valve 37 would follow the pressure in line 34b to admit air at the same modulated pressure to line 34 and brake chambers 35, 36.

Valve 37 is a common type of relay valve well known in the art. The valve 37 outlined here could be Relay Valve No. N-2531-A of the Midland Steel Products Co., Detroit, Michigan.

Since in these prior art systems all of the brakes of the train were intended to operate at the same time it could and did happen that due to the shorter lines or for other reasons the front vehicle brakes would operate slightly ahead of the rear vehicle brakes and give the train a tendency to buckle or "jack-knife" or throw the train out of alignment. Serious accidents from this cause have occurred.

Now leaving the old art, omitting lines 34a and 34b and considering the system of Fig. 1 as shown with venturi tube 38 inserted in line 25 and with the control end of valve 37 connected to the throat of venturi tube 38 by line 39, we see that when the pedal of foot valve 24 is depressed the rush of air through line 25 to line 26 and relay 19 causes a reduction of pressure on line 39 to withdraw air instantaneously from line 39 and the control chamber of valve 37 to hold off the application of air to front brake chambers 35 and 36 until after control air in line 26 has begun to build up pressure in the control chamber of valve 19 and start the application of the rear vehicle brakes. Then the air pressure in line 26 is equalized, the venturi action of part 38 substantially stops and air is applied normally through line 39 to the control chamber of valve 37 which then causes air from line 16 to pass to brake chambers 35, 36 through line 34.

By this simple but un-obvious use of venturi tube 38 in the system the action of the brakes on the forward vehicle may be delayed about one fifth of a second after the operation of the rear vehicle brakes and the tendency to "jack-knife" is eliminated. This is particularly important on the mountainous roads of the West and more so under wet or frosty conditions.

It is of course understood that we are here dealing with short periods of time and the vehicles to which the system may be applied will vary as to size and lengths of airlines installed. It is therefore desirable at times to have means for lengthening the time delay of the front vehicle brakes and even to adjust the value of this time delay for a given train or installation.

This time delay can be increased and even adjusted to suit the particular installation by the arrangement shown in Fig. 2 which is a fragmentary modification of the system shown in Fig. 1. In the arrangement shown in Fig. 2, a second venturi-tube 40 is connected in a line 41 leading from the throat of venturi-tube 38 to a variable volume air accumulator 42 seen to be provided with a piston 43 having a stem 44 threadedly engaging one head of the drum 42. A knurled knob 45 on stem 43 or other means can be used for positioning piston 43 to vary the usable size of accumulator drum 42 and thus vary the delay time of the brakes. In this case line 39 connects the control chamber of relay valve 37 to the throat of additional venturi tube 40.

With the arrangement of Fig. 2, as foot valve 24 admits air to line 25 on its way to line 26 the reduced pressure at the throat of venturi tube 38 will cause a sudden rush of air from drum 42 through line 41 and venturi tube 40 which additional air added to the air in line 25 will hasten actuation of relay valve 19 and the brakes on the rear vehicle. Also when line 26 is filled and the pressure backed up in line 25, air from line 25 through line 41 will have to build up pressure in drum 42 before it is effective through line 39 to control relay 37 to actuate brake operators 35, 36. It should also be noted that if additional venturi tube 40 is formed with a long internal taper at either end and with the throat in the middle it will be effective to withhold air pressure from the control chamber of relay 37 when the air is rushing thru line 41 either to or from drum 42.

Another very practical way of assuring definite delaying action of the forward brakes by the venturi tube system of Fig. 1 is by the addition to venturi tube 38 in the system of differential valve 46 as shown in Fig. 3 and 4. Fig. 3 is a fragment of Fig. 1 in which the differential chambers 47, 48 of valve 46 are connected respectively to control line 25 and the throat of venturi tube 38 by lines 49, 50. Line 39 connects the control chamber of relay valve 37 to the valve chamber 51 of differential valve 46. Differential valve seat 52 is formed in chamber 51 around the differential valve port formed in wall 53. Differential valve 54 in chamber 51 is secured to one end of valve stem 55 the other end of which is secured to flexible diaphragm 56 as shown. Diaphragm 56 is secured between valve body 57 and cap 58 by bolts 59 as shown. Formed in chamber 47 around the exhaust port in wall 53 is exhaust valve seat 60. Light spring 61 strained between cup 62 of exhaust valve 63 and its end ring 64 positioned by snap ring 65 biases valve 43 towards its seat 60.

In operation the modified system of Fig. 3 will be seen to operate to withhold operating air in line 25 from relay 37 as long as there is the slightest reduction of pressure at the throat of venturi tube 38 below the pressure in line 25 on the entrance side of tube 38 for as air is admitted by foot valve 24 to line 25 to pass through tube 38 to line 26 the reduced pressure at the throat of tube 38 will be effective on the top of diaphragm 56 and the full pressure of line 25 will be effective on the under side of diaphragm 56 and valve 54 will be held closed on its seat 52. At the same time light spring 61 aided by the pressure of air in line 25 effective in chamber 47 will hold exhaust valve 63 closed on its seat 60.

When the air in line 26 is effective at relay 19 and backs up to equalize the throat and entrance pressure at tube 38 the pressures in chambers 47 and 48 will equalize and the pressure in chamber 47 acting on valve 54 will open valve 54 without interference from diaphragm 56. Air under pressure from line 25 will then be effective through line 49, chambers 47, 51 of valve 46 and line 39 to actuate relay 37. When less forward vehicle brake pressure is desired and the operator eases his foot on valve 24, line 25 will exhaust to a lower pressure than line 39 and even though valve 54 closes on seat 52, valve 63 will rise off its seat 60 against the pressure of light spring 61 and line 39 will exhaust past valve 62 to equalize its pressure with that of line 25.

A modified form of the differential valve of Figs. 3 and 4 is shown as 46a in Fig. 5 where exhaust ports 66 are formed in differential valve cup 67. Flexible exhaust valve disk 68 is held at its center on valve cup 67 by nut 69 on stem 55. As in the type of valve shown in Fig. 4 the exhaust valve disk of the Fig. 5 type valve will be closed on its seat when the pressure in chamber 47 is greater than the pressure in chamber 51 and will be opened off its seat when the pressure in chamber 51 is greater than the pressure in chamber 47.

As shown in Fig. 6 when added to Fig. 1 it is apparent that my system is equally effective for trains of more than two vehicles. Thus referring to Fig. 1 the equipment on the forward vehicle is separable from the equipment on the rearward vehicle at the line 18. With a train of three vehicles the equipment on the forward and rearward vehicles would remain as shown in Fig. 1 and the equipment on the intermediate vehicle would be as shown in Fig. 6 between the lines 18a and 18b and connected in the obvious manner. Thus line 26 would include in sequence stop valve 29 and one half of coupling 27 on the forward vehicle; half coupling 27a, venturi tube 38a, stop valve 29a and half coupling 27b on the intermediate vehicle; and one half of coupling 27 on the rearward vehicle. Similarly line 16 would include stop valve 28 and one half of coupling 27 on the forward vehicle; half coupling 17a stop valve 28a and coupling 17 on the intermediate vehicle; and one half of coupling 17 on the rearward vehicle. Relay 37a on the intermediate vehicle would be connected between line 16 and line 340 leading to intermediate vehicle brake air chambers 35a, 36a and the control air chamber in relay 37a would be connected by line 39a to the throat of venturi tube 38a. In this case as foot valve 24 is operated air rushing through lines 25 and 26 including venturi tubes 38 and 38a respectively will delay the operation of brakes 35a, 36a until brakes 32, 33 are operated and in turn will delay the operation of brakes 35, 36 until brakes 35a, 36a are operated.

Having thus recited generally the provisions or objects of my invention, illustrated and explained some of the system combinations and required apparatus which may be used to practice my invention and explained their methods of operation, I claim:

1. In an air brake system for a train of two or more vehicles, each of said vehicles having rotatable supporting wheels and a wheel brake on at least one of said wheels, each of said brakes including air motor means for the operation thereof, relay means on each of said vehicles for actuating said air motor means on said vehicle, a source of air under pressure on the leading vehicle of said train, a control air line from said source of air to each of said vehicles in their consecutive rearward positions and an emergency air line from said source of air to each of said relay means: a respective venturi tube inserted in said control air line on each except the most rearward of said vehicles, a pilot valve in said control line between said source of air and the forwardmost one of said venturi tubes and a respective differential pressure valve associated with each of said respective venturi tubes on each except the most rearward of said vehicles; said differential pressure valve comprising a hollow body, the interior of said body having a transverse wall formed therein to divide said interior into a valve chamber and a second chamber, a flexible diaphragm adapted to divide said second chamber into a first differential chamber and a second differential chamber, said wall being between said second differential chamber and said valve chamber, a differential valve port formed on said transverse wall, a differential valve seat formed on said transverse wall about said port in said valve chamber, a differential valve in said valve chamber, means adapting said diaphragm to position said valve with relation to said valve seat; the throat of said respective venturi tube being connected to said first differential chamber of said body, said second differential chamber being connected to said control line between said respective venturi tube and said pilot valve, and said valve chamber being connected to the relay means for actuating the air motor means for operating an air brake on the vehicle carrying the respective venturi tube and the respective differential valve; whereby said venturi tube and said differential pressure valve are adapted to control the air supplied the relay of their respective vehicle to delay the activation of the air motor means of the brakes of their respective vehicle until the brakes of the next more rearward vehicle have been applied.

2. For use in the air brake system of a train of vehicles, said system comprising a source of air under pressure, a pilot air valve on the leading one of said vehicles of said train, at least two of said vehicles having air brakes included in said system, each of said two vehicles having air motor means for its said brakes and activating relay means for its said motor means, said system including a control air line from said source through said pilot air valve to the activating relay means of the air motor means of the rearmost vehicle having air brakes included in the system, an emergency air line from said source to each of said motor means through its respective relay, delay means adapted on the initiation by said pilot air valve through said control line of the activation of all of the relay means of all of the air motor means of all of the air brakes of the system to delay the activation of the relay means of a particular vehicle until after the activation of the relay means of the next rearward vehicle having air brakes included in the system, said delay means comprising a venturi tube connected in said control line on said particular vehicle, a differential air valve, a first conduit, a second conduit and a third conduit, said differential air valve including a hollow body divided into a first differential chamber by one wall section of said body and a flexible transverse diaphragm, a second differential chamber by said diaphragm a transverse wall spaced from said diaphragm and a second wall section of said body, and a valve chamber by said transverse wall and a third wall section of said body, said transverse wall having a valve port formed therein axially aligned with said diaphragm, and a valve in said valve chamber adapted to be positioned with respect to said port by said diaphragm, said first conduit connecting said first differential chamber with the throat of said venturi tube, said second conduit connecting said second differential chamber with said control line between said venturi tube and said pilot valve and said third conduit connecting said valve chamber with said activating relay means of said air motor means of said air breakes of said particular vehicle, whereby activating air from said control line to the activating relay means of said particular vehicle will be delayed until activating air has been supplied to the activating relay means of the next rearward vehicle and the air pressure in the air line at the throat of said venturi tube rises sufficiently to supply activating air to the activating relay means of the particular vehicle.

3. A differential air pressure actuated valve means adapted to prevent the passage of air from an air line to one air operated means while air is being supplied by said air line to another air operated means and to supply air from said air line to said one air operated means when the supply of air to said other air operated means has substantially ceased, said air line being supplied with air under pressure from a source, comprising a venturi tube in said air line between said air supplying means and said other air operated means, means forming a first differential air chamber, a second differential air chamber and a valve chamber, said first and second differential air chambers being separated by a flexible diaphragm, said second differential air chamber and said valve chamber being separated by a transverse wall spaced from said diaphragm, said transverse wall having a valve port formed therein axially aligned with said diaphragm, a valve in said valve chamber, means connecting said valve with said diaphragm to be operated thereby to open or close said port, means connecting said first differential chamber to the throat of said venturi-tube, means connecting said second differential chamber to said air line between said venturi tube and said source and means connecting said valve chamber to said one air operated means.

4. The apparatus of claim 3 adapted for use with said air line when said air line is provided with means for being alternately supplied with air under pressure and exhausted of air under pressure and it is required to exhaust air under pressure from said one air operated means when said air line is exhausted of air under pressure, said apparatus including an exhaust valve port formed in said transverse wall, an exhaust valve in said second differential chamber and means biasing said exhaust valve towards said exhaust valve port.

5. The apparatus of claim 3 characterized in that said exhaust valve port is formed in said differential valve to connect said valve chamber and said second differential chamber when said differential valve is closed on its port in said wall and said exhaust valve is carried on the second differential chamber side of said differential valve.

References Cited in the file of this patent

UNITED STATES PATENTS

| 1,936,827 | Campbell | Nov. 28, 1933 |
| 2,182,047 | Eaton | Dec. 5, 1939 |
| 2,219,488 | Parker | Oct. 29, 1940 |
| 2,411,406 | Affleck | Nov. 19, 1946 |